(12) United States Patent
Singh et al.

(10) Patent No.: US 9,608,943 B2
(45) Date of Patent: Mar. 28, 2017

(54) METHOD OF QUEUING SIGNALS

(71) Applicant: Yahoo! Inc., Sunnyvale, CA (US)

(72) Inventors: Ashutosh Singh, San Jose, CA (US);
Varun Bhagwan, San Jose, CA (US);
Jaikit Savla, Santa Clara, CA (US);
Rahul Teotia, Sunnyvale, CA (US)

(73) Assignee: Yahoo! Inc., Sunnyvale, CA (US)

( * ) Notice: Subject to any disclaimer, the term of this patent is extended or adjusted under 35 U.S.C. 154(b) by 226 days.

(21) Appl. No.: 14/192,771

(22) Filed: Feb. 27, 2014

(65) Prior Publication Data

US 2015/0244577 A1    Aug. 27, 2015

(51) Int. Cl.
*G06F 15/16* (2006.01)
*H04L 12/58* (2006.01)

(52) U.S. Cl.
CPC .............. *H04L 51/04* (2013.01); *H04L 51/34* (2013.01); *H04L 51/32* (2013.01)

(58) Field of Classification Search
USPC .................................................. 709/206, 223
See application file for complete search history.

(56) References Cited

U.S. PATENT DOCUMENTS

| | | | |
|---|---|---|---|
| 5,452,430 A | 9/1995 | Dievendorff et al. | |
| 6,853,650 B1* | 2/2005 | Hutzelmann | H04L 12/66 370/468 |
| 7,549,151 B2 | 6/2009 | Zhou et al. | |
| 8,370,395 B1* | 2/2013 | Gupta | G06F 17/3089 707/799 |
| 2002/0181496 A1* | 12/2002 | Narasimhan | H04L 12/58 370/466 |
| 2003/0212660 A1* | 11/2003 | Kerwin | G06F 17/3056 |
| 2008/0219279 A1* | 9/2008 | Chew | H04L 12/5693 370/412 |
| 2013/0144967 A1* | 6/2013 | Chen | G06F 9/546 709/213 |
| 2014/0149520 A1* | 5/2014 | Granshaw | H04L 12/5885 709/206 |

OTHER PUBLICATIONS

Mohan, Recent Work on Distributed Commit Protocols, and Recoverable Messaging and Queuing, IBM Almaden Research Center, San Jose, CA, pp. 22-27.

Kreps, Kafka: a Distributed Messaging System for Log Processing, NetDB'11, Jun. 12, 2011, Athens, Greece, 7 Pages.

* cited by examiner

*Primary Examiner* — Philip B Tran
(74) *Attorney, Agent, or Firm* — Berkeley Law & Technology Group, LLP

(57) ABSTRACT

Example methods, apparatuses, and/or articles of manufacture are disclosed that may be implemented, in whole or in part, using one or more computing devices to implement a queuing system with an adjustable scalability/reliability level.

20 Claims, 3 Drawing Sheets

METHOD OF QUEUING SIGNALS

BACKGROUND

1. Field

The present disclosure relates generally to queuing services, queuing signal packets, for example.

2. Information

Transmission and/or reception of signals via the Internet between users and computing devices occur at an ever increasing rate. Reception and/or transmission of signals may come in any of many forms, such as, for example, email, instant messages, tweets, and/or social media messages (e.g., posts), to name but a few examples. Because, among other things, communicating devices and/or intermediate devices may not operate at correspondingly similar speeds and/or may not be in concurrent communication, for example, transmitted signals may be queued for later retrieval and/or transmission. Likewise, as scale increases, so does an associated queue. Reliability (e.g., consistency) may likewise be a factor as scale increase. For instance, even in a system with 99.999% reliability, for a large number of overall transmissions, potential impact in terms of total number of transmissions lost may still be significant. Examples of relatively small scale commercial systems, such as database management systems (DBMS), for example, with good reliability exist. However, as scale increases, an ability to handle an increasing scale and reliability, such as without a substantial degradation in reliability, may present a challenge.

BRIEF DESCRIPTION OF THE DRAWINGS

Claimed subject matter is particularly pointed out and distinctly claimed in the concluding portion of the specification. However, both as to organization and/or method of operation, together with objects, features, and/or advantages thereof, it may best be understood by reference to the following detailed description if read with the accompanying drawings in which:

Figure 1:
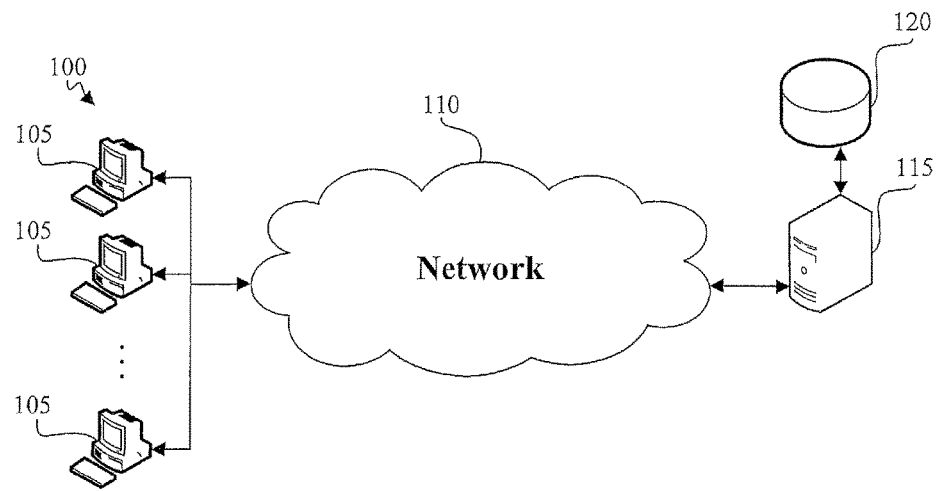
FIG. 1 is a schematic diagram illustrating certain features of an implementation of an example queuing system.

Reference is made in the following detailed description to accompanying drawings, which form a part hereof, wherein like numerals may designate like parts throughout to indicate corresponding and/or analogous components. It will be appreciated that components illustrated in the figures have not necessarily been drawn to scale, such as for simplicity and/or clarity of illustration. For example, dimensions of some components may be exaggerated relative to other components. Further, it is to be understood that other embodiments may be utilized. Furthermore, structural and/or other changes may be made without departing from claimed subject matter. It should also be noted that directions and/or references, for example, up, down, top, bottom, and so on, may be used to facilitate discussion of drawings and/or are not intended to restrict application of claimed subject matter. Therefore, the following detailed description is not to be taken to limit claimed subject matter and/or equivalents.

DETAILED DESCRIPTION

In the following detailed description, numerous specific details are set forth to provide a thorough understanding of claimed subject matter. However, it will be understood by those skilled in the art that claimed subject matter may be practiced without these specific details. In other instances, methods, apparatuses, and/or systems that would be known by one of ordinary skill have not been described in detail so as not to obscure claimed subject matter.

With advances in technology, it has become more typical to employ distributed computing approaches in which one or more computational tasks may be divided among computing devices, including one or more clients and one or more servers, via a computing and/or communications network. A network may comprise two or more network devices and/or may couple network devices so that signal communications, such as in the form of signal packets, for example, may be exchanged, such as between a server and a client device and/or other types of devices, including between wireless devices coupled via a wireless network, for example. A network may be very large, such as comprising thousands of nodes, millions of nodes, billions of nodes, or more, as examples.

In this context, the term network device refers to any device capable of communicating via and/or as part of a network and may comprise a computing device. While network devices may be capable of sending and/or receiving signals (e.g., signal packets), such as via a wired and/or wireless network, they may also be capable of performing arithmetic and/or logic operations, processing and/or storing signals, such as in memory as physical memory states, and/or may, for example, operate as a server in various embodiments. Network devices capable of operating as a server, or otherwise, may include, as examples, dedicated rack-mounted servers, desktop computers, laptop computers, set top boxes, tablets, netbooks, smart phones, integrated devices combining two or more features of the foregoing devices, the like and/or any combination thereof. Signal packets, for example, may be exchanged, such as between a server and a client device and/or other types of network devices, including between wireless devices coupled via a wireless network, for example. It is noted that the terms, server, server device, server computing device, server computing platform and/or similar terms are used interchangeably. Similarly, the terms client, client device, client computing device, client computing platform and/or similar terms are also used interchangeably. While in some instances, for ease of description, these terms may be used in the singular, such as by referring to a "client device" or a "server device," the description is intended to encompass one or more client devices and/or one or more server devices, as appropriate. Along similar lines, references to a "database" are understood to mean, one or more databases and/or portions thereof, as appropriate.

It should be understood that for ease of description a network device (also referred to as a networking device) may be embodied and/or described in terms of a computing device. However, it should further be understood that this description should in no way be construed that claimed subject matter is limited to one embodiment, such as a computing device or a network device, and, instead, may be embodied as a variety of devices and/or combinations thereof, including, for example, one or more illustrative examples.

A network may also include now known, and/or to be later developed arrangements, derivatives, and/or improvements, including, for example, past, present and/or future mass storage, such as network attached storage (NAS), a storage area network (SAN), and/or other forms of computer and/or machine readable media, for example. A network may include the Internet, one or more local area networks (LANs), one or more wide area networks (WANs), wire-line type connections, wireless type connections, other connections, and/or any combination thereof. Thus, a network may be worldwide in scope and/or extent. Likewise, sub-networks, such as may employ differing architectures and/or may be compliant and/or compatible with differing protocols, such as computing and/or communication protocols (e.g., network protocols), may interoperate within a larger network. In this context, the term sub-network refers to a portion and/or part of a network. Various types of devices, such as network devices and/or computing devices, may be made available so that device interoperability is enabled and/or, in at least some instances, may be transparent to the devices. In this context, the term transparent refers to devices, such as network devices and/or computing devices, communicating via a network in which the devices are able to communicate via intermediate devices, but without the communicating devices necessarily specifying one or more intermediate devices and/or may include communicating as if intermediate devices are not necessarily involved in communication transmissions. For example, a router may provide a link and/or connection between otherwise separate and/or independent LANs.

In this context, a private network refers to a particular, limited set of network devices able to communicate with other network devices in the particular, limited set, such as via signal packet transmissions, for example, without needing to re-rout and/or redirect such network communications. A private network may comprise a stand-alone network; however, a private network may also comprise a subset of a larger network, such as, for example, without limitation, the Internet. Thus, for example, a private network "in the cloud" may refer to a private network that comprises a subset of the Internet, for example. Although signal packet transmissions may employ intermediate devices to exchange signal packet transmissions, those intermediate devices may not necessarily be included in the private network by not being a source or destination for one or more signal packet transmissions, for example. It is understood in this context that a private network may provide outgoing network communications to devices not in the private network, but such devices outside the private network may not direct inbound network communications to devices included in the private network.

The Internet refers to a decentralized global network of interoperable networks that comply with the Internet Protocol (IP). It is noted that there are several versions of the Internet Protocol. Here, the term Internet Protocol or IP is intended to refer to any version, now known and/or later developed. The Internet includes local area networks (LANs), wide area networks (WANs), wireless networks, and/or long haul public networks that, for example, may allow signal packets to be communicated between LANs. The term world wide web (WWW) and/or similar terms may also be used, although it refers to a sub-portion of the Internet that complies with the Hypertext Transfer Protocol or HTTP. It is noted that there are several versions of the Hypertext Transfer Protocol. Here, the term Hypertext Transfer Protocol or HTTP is intended to refer to any version, now known and/or later developed. It is likewise noted that in various places in this document substitution of the term Internet with the term world wide web may be made without a significant departure in meaning and may, therefore, not be inappropriate in that the statement would remain correct with such a substitution.

Signal packets, also referred to as signal packet transmissions, may be communicated between nodes of a network, where a node may comprise one or more network devices and/or one or more computing devices, for example. As an illustrative example, but without limitation, a node may comprise one or more sites employing a local network address. Likewise, a device, such as a network device and/or a computing device, may be associated with that node. A signal packet may, for example, be communicated via a communication channel and/or a communication path comprising the Internet, from a site via an access node coupled to the Internet. Likewise, a signal packet may be forwarded via network nodes to a target site coupled to a local network, for example. A signal packet communicated via the Internet, for example, may be routed via a path comprising one or more gateways, servers, etc. that may, for example, route a signal packet in accordance with a target address and availability of a network path of network nodes to a target address. Although the Internet comprises a network of interoperable networks, not all of those interoperable networks are necessarily available or accessible to the public.

Although physically connecting a network via a hardware bridge is done, a hardware bridge may not typically include a capability of interoperability via higher levels of a network protocol. A network protocol refers to a set of signaling conventions for computing and/or communications between or among devices in a network, typically network devices; for example, devices that substantially comply with the protocol and/or that are substantially compatible with the protocol. In this context, the term "between" and/or similar terms are understood to include "among" if appropriate for the particular usage. Likewise, in this context, the terms "compatible with", "comply with" and/or similar terms are understood to include substantial compliance and/or substantial compatibility.

Typically, a network protocol has several layers. These layers may be referred to here as a network stack. Various types of network transmissions may occur across various layers. For example, as one moves higher in a network stack, additional operations may be available by initiating network transmissions that are compatible and/or compliant with a particular network protocol at these higher layers. Therefore, for example, a hardware bridge may be unable to forward signal packets since it may operate at a layer of a network stack that does not provide that capability. Although higher layers of a network protocol may, for example, affect device permissions, user permissions, etc., a hardware bridge, for example, may typically provide little user control, such as for higher layer operations.

A VPN may enable a remote device to communicate via a local network, but may also have drawbacks. A router may allow network communications in the form of network transmissions (e.g., signal packets), for example, to occur from a remote device to a VPN server on a local network. A remote device may be authenticated and a VPN server, for example, may create a special route between a local network and the remote device through an intervening router. However, a route may be generated and/or also regenerate if the remote device is power cycled, for example. Also, a VPN typically may affect a single remote device, for example, in some situations.

Some example methods, apparatuses, and/or articles of manufacture are disclosed herein that may be used, in whole or in part, to facilitate and/or support one or more processes and/or operations for queuing signal packets and/or groupings thereof, such as within a distributed system. One or more signal packets, and/or groupings thereof, may be stored as a physical state in a variety of ways, such as using stored electrons in a random access memory, for example. Of course, this is simply an illustrative example and claimed subject matter is not limited in scope to illustrations. As another example, a signal packet may be stored as a physical state in a phase change memory. In this context, the term "signal packet(s)" may be used to signify signals and/or states, independent of the particular form of the signals and/or states. As previously suggested, a distributed system may refer to a system distributed over a network, such as a system comprising hardware, software, and/or firmware (other than software per se), in which particular components of the network, such as particular network devices, for example, communicate and/or coordinate communication, such via transmission of one or more signal packets, to form a distributed system.

For example, in the case of a distributed system related to a social network, as simply a non-limiting illustrative example, a plurality of network devices that may be distributed over a larger network, for example, may transmit and/or receive signal packets, which may comprise messages, such as text, images, audio, video, and/or other compositions of signals, for example. Thus, likewise, users of those devices may transmit and/or receive signal packets, which may comprise messages, for example. Of course, this is merely one example relating to a distributed system, and claimed subject matter is not so limited.

In general, signal packets may be transmitted synchronously, asynchronously, and/or a combination. In one embodiment, a given transmission protocol, such as for synchronous communications, for example, may have processing specifications for transmission and/or reception, such as related to timing, for example, that may make it more challenging for signal packets to also be scanned and/or otherwise analyzed, in addition to processing for transmission and/or reception, such as by a network device included in the distributed system. Whether transmissions are synchronous, asynchronous or a combination, in another case, two or more network devices transmitting and/or receiving signal packets (e.g., in communication) may operate at different speeds. In another embodiment, network devices in a distributed system may be coupled to a larger network at non-overlapping times. In still another embodiment, a network device of a distributed system may crash or otherwise unexpectedly go offline and, therefore, may not be available to transmit and/or receive signal packets.

Typically, situations such as those described above, as well as others, may employ a queue (also referred to here as a queuing system or a queuing service), so that one or more signal packets may be buffered in a memory, such as on a device coupled to the network that includes the distributed system, at least until conditions are such that the signal packets may again continue along their transmission path. For example, referring to FIG. 1, a system embodiment may include one or more client devices, such as client devices 105 and one or more server devices, such as server device 115. Furthermore, server 115, as illustrated, includes a local memory 120.

Thus, for example, client 105 may transmit one or more signal packets via network 110, thus, operating as a source in this example. Although server 115 may not necessarily be the destination of the signal packets, server 115 may comprise an intermediate device before the signal packets arrive at their destination. Thus, server 115 may receive the one or more signal packets and store them in, for example, memory, such as local memory 120.

In one example, server 115 may include a database. Although claimed subject matter is not limited in scope in this respect, in addition to memory, a database may in some embodiments at least include software and/or firmware to manage content stored within the database, such as database indices, database procedures, and/or other operations capable of being executed in conjunction with use of the database. Likewise, it is understood that database also refers to content stored within the database; however, since content stored within a database may change over time, at times the term database instance may be employed if appropriate to clarify that a particular database has not changed in terms of underlying structure, however, content stored within the database may have changed.

Thus, in an embodiment, server 115 may store received signal packets locally in its database to provide a queuing service, at least until conditions are such that the signal packets may continue to be transmitted to their destination. In general, in this context, a device, such as a network device, operating as a queue, will also include a database for durability and/or to manage the contents of the queue.

It is, of course, noted that the foregoing discussion has been simplified for purposes of illustration. Thus, again, claimed subject matter is not limited in scope to illustrations. For example, server 115 may comprise multiple servers, as one example. Likewise, server 115 may comprise multiple databases, as another example. Similarly, signal packets may be stored externally to server 115 in another embodiment. Server 115 may store the one or more signal packets until such time as it may be appropriate dequeue them, as implied previously.

For a relatively large network, associated with an increase in scale, likewise, as was mentioned previously, scale or size of queues that may be employed may also increase. Reliability (e.g., consistency) may likewise be a factor as scale increase. For instance, even in a system with 99.999% reliability, for a large number of overall transmissions, potential impact in terms of total number of transmissions lost may still be significant. Likewise, as scale increases, an ability to handle an increasing scale and reliability, such as without a substantial degradation in reliability, may present a challenge.

Figure 2:
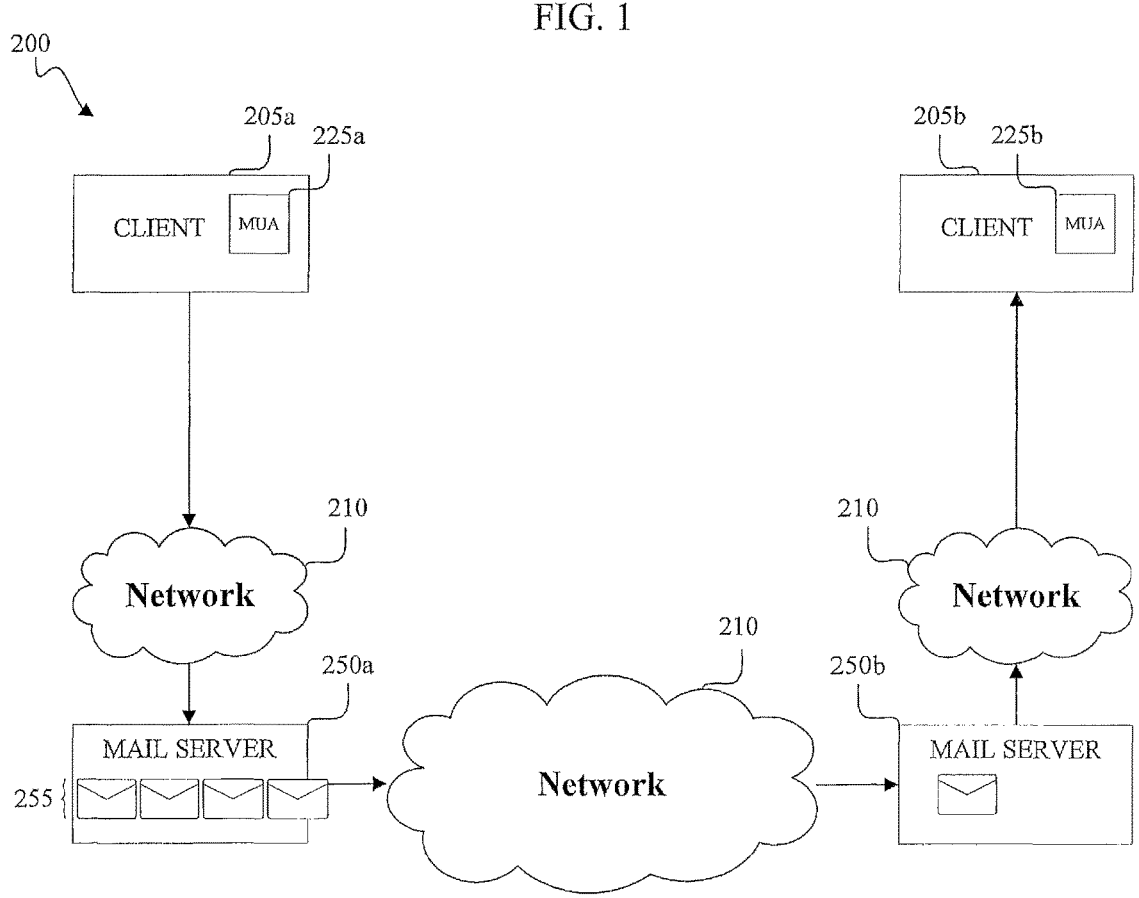
FIG. 2 is another schematic diagram illustrating certain features of an implementation of an example queuing system.

FIG. 2 illustrates another example queuing system, in this case, in connection with an email messaging system. For instance, in one embodiment, a client device 205*a* may comprise and/or may execute an email client 225*a*, such as for organizing email on the client, for composing email to be transmitted, etc. For example, in an embodiment, an email generated via device 205*a* may comprise one or more signal packets. In an embodiment, an email, in the form of one or more signal packets, for example, may be transmitted via network 210 to mail server 250*a*, where the signal packets may be queued, as illustrated by the queue of signal packets 255. Again, for purposes of explanation, aspects may have been simplified. Furthermore, any one of a host of different embodiments are possible within claimed subject matter. Therefore, illustrations, such as this example, are not intended to limit claim scope. Any number of other possible arrangements including, for example, other network devices, may, for example, be employed in an embodiment and fall within claimed subject matter.

Continuing with this example, under appropriate conditions, an email, such as in the form of one or more signal packets, may be dequeued and transmitted via network 210 to a mail server 250*b*. For purposes of clarity, it is noted that FIG. 2 is intended to illustrate one network 210 with a distributed system, such as one comprising email clients and email servers, although, of course, claimed subject matter is not limited in scope in this respect. In one embodiment, one or more signal packets received at mail server 250*b* may also be queued. Likewise, again, under appropriate conditions, signal packets at mail server 250*b* may be dequeued and transmitted via network 210 to client device 205*b*. Thus, FIG. 2 illustrates a computing environment 200, here, email messaging capable of facilitating communication (e.g., signal packets) via use of a queuing service. In this context, client 205*a* comprises a producer of email messages and client 205*b* comprises a consumer of email messages.

As previously indicated, a queue is implemented in connection with a database for reliability purposes. Therefore, in the forgoing example, typically a DBMS may employ a relational database. Typically, reliable DBMS are commercially available. However, a disadvantage associated with a relational database, particularly if scale were to increase, may be a decrease in throughput due at least in part to reliability type constraints imposed by the DBMS. Furthermore, databases may offer reliability across multiple updates. Typically, in a relational database, for technical reasons, which may include reliability, tables and indices are arranged sequentially in memory in some fashion with a limited number of entry points. Although such an arrangement may support reliability, as indicated, as scale increases, throughput may be less than desired, for example. In contrast, a column-oriented database may employ columns that are separated, even across multiple devices, and, therefore, may be more readily scalable, for example. They also provide scalability across atomic operations on single updates which may increases throughput while potentially maintaining reliability.

Figure 3:
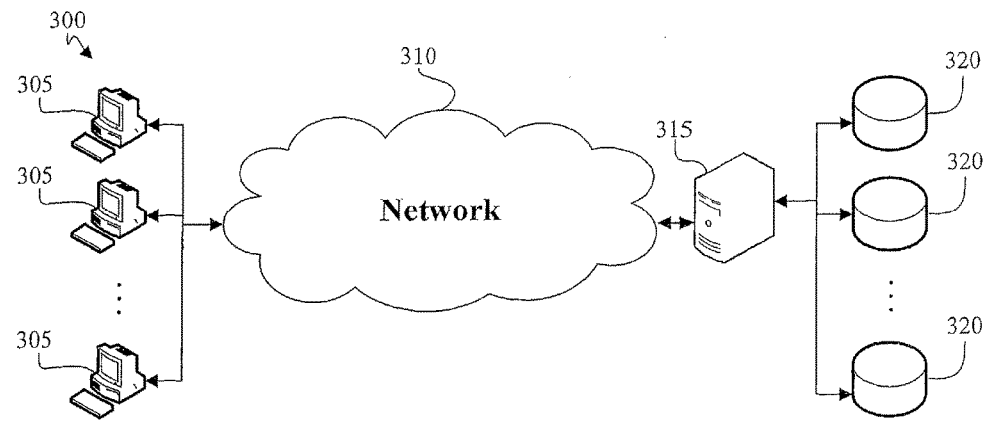
FIG. 3 is yet another schematic diagram illustrating certain features of an implementation of an example queuing system.

In one embodiment, as illustrated in FIG. 3, to perhaps address throughput multiple instances of a database 320 may exist and be managed by one or more DBMSs. For example, as the number of databases 320 increases, so too does the number of points of entry through which signal packets may be received and/or transmitted. However, likewise, such an arrangement also increases complexity for coordination of content between database instances and may also reduce reliability, since a greater possibility of a lost or dropped packet may be present in comparison with the previous example. In this context, reliability of a queue refers to an error rate and/or a number of errors per number of signal packet transactions. Likewise, scalability refers to the capability of a queue to increase throughput. As discussed below, this may be accomplished in various ways including through addition of nodes for database instances. However, as the two previous illustrative examples suggest, often as scalability increases, likewise reliability may decrease at least approximately.

For example, in one embodiment, a distributed system may have a limited number of customers, producers, clients, etc. initially accessing the distributed system. However, there may be interest in the ability to scale the distributed system as the volume of signal packets within the distributed system increases. In another embodiment, a given distributed system may periodically receive relatively large spikes in usage. For instance, for distributed systems related to events such as, for example, taxation, insurance renewal, student signup and/or class selection, and/or other events that might experience periodic spikes in transmission, reception, and/or storage. The preceding examples are offered to illustrate certain non-limiting cases where a queuing system capable of providing adjustable scalability/reliability levels may be desirable.

Figure 4:
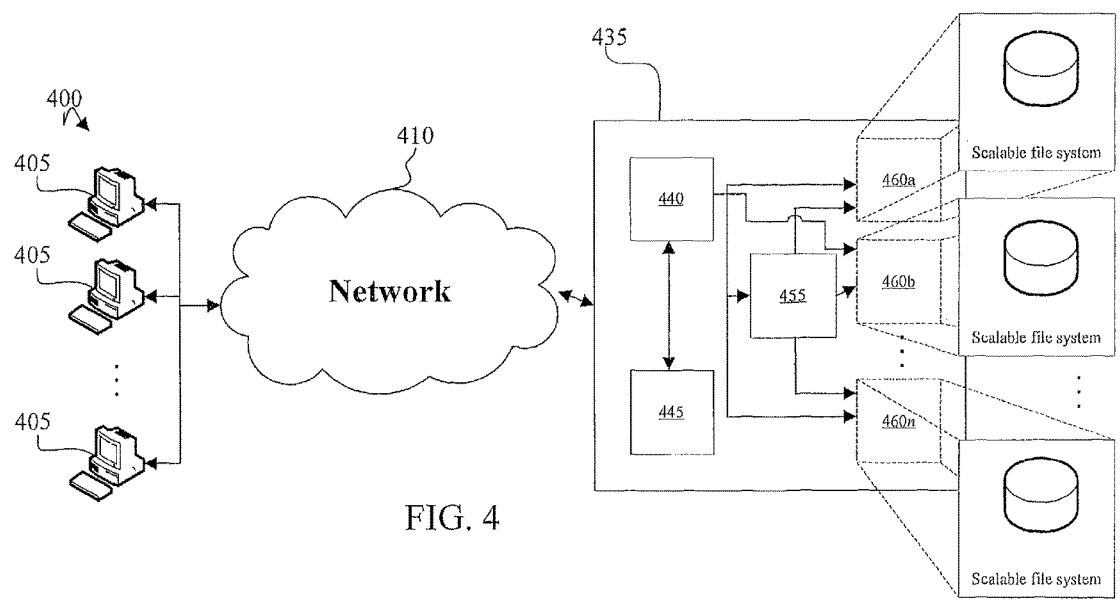
FIG. 4 is still another schematic diagram illustrating certain features of an implementation of an example queuing system.

As indicated, a desirable feature of an embodiment, such as a system in accordance with claimed subject matter, may include the ability to adjust scale and/or reliability. For example, although claimed subject matter is not limited in scope in this respect, scale in one embodiment may be measured in terms of signal packet throughput. Likewise, although claimed subject matter is not limited in scope in this respect, reliability in one embodiment may be measured in terms of signal packet error rate. FIG. 4, for example, illustrates an embodiment of a queuing system having an adjustable scalability/reliability level. For instance, computing environment 400 may comprise a reliable persistent queue (RPQ) 435. As used herein, a reliable persistent queue refers to any suitable combination of software, hardware, and/or firmware (other than software per se) related to management and administration of a queuing system in which the queuing system is capable of adjustment of a scalability/reliability level, such as real-time adjustment. As disclosed in more detail below, a variety of mechanisms may be employed in a variety of embodiments to adjust scalability/reliability level. Thus, in this context, an RPQ refers a queuing system that includes scalability/reliability level adjustment capability.

For example, in one embodiment, RPQ 435 may be capable of receiving signal packets, transmitting signal packets, and/or replicating and persisting signal packets in a queue, among other things. RPQ 435 may comprise one or more network devices and/or computing devices, for example. As shown in FIG. 4, in the embodiment illustrated, RPQ 435 comprises a web server 440, a messaging component 445, a distributed system coordination component 455, and one or more database instances, such as databases 460*a*, 460*b*, . . . , and 460*n*.

In one embodiment, RPQ 435 may be distributed across a plurality of server devices (not shown). For instance, a first group of server devices may comprise web server 440 and message component 445. A second group of server devices may comprise distributed system coordination component 455. Likewise, databases 460*a-n* may be located on a third group of server devices. However, the foregoing is merely an illustrative example and claimed subject matter is not limited to such an illustration. For example, alternatively, components of RPQ 435 may be located on one device.

Turning now to the embodiment illustrated in FIG. 4, a signal packet may be transmitted from a client device, such as, for example, client device 405, via network 410, to RPQ 435. The signal packet may be received by web server 440, and may thereafter be replicated to database instances 460*a-n* for queuing. Distributed system coordination component 455 may manage the replication of the signal packet and/or the synchronization of database instances 460*a-n*.

In one embodiment, a message may be represented by one or more signal packets. The one or more signal packets may be queued and replicated on databases 460; however, a message size threshold may, for example, affect queuing and replication. For example, in an embodiment, rather than replicating the one or more signal packets on all databases 460, depending at least in part on message size, signal packets may be replicated and may be stored on less than the total number of database instances and the remaining instances may instead include some form of pointer, handle, or link to a stored version of the one or more signal packets. Thus, in one embodiment, signal packets received by RPQ 435 may be evaluated to determine whether to replicate or to use a pointer. Thus, for a given signal packet, for example, in an embodiment, the signal packet or the relevant pointer may be replicated and persisted to database instances 460a-n.

An embodiment operating as described, for example, may have advantages. For example, a reduction in copying from one sub-system (e.g., database instance) to another may, for example, provide extra time for processing and/or analysis. Furthermore, an embodiment as described does not have a signal point of failure, so to speak. That is, in this example, signal packets have been replicated to database instances 460a-n, so that failure of a single node, for example, or even multiple nodes, does not result in loss of signal packets. Furthermore, in the case of failure, recovery and failure analysis may be possible.

Furthermore, as previously discussed, essentially in real-time, if desired, a message size threshold be altered to, in effect, adjust a scalability/reliability level. For example, assume a message threshold size in an embodiment initially comprises 2 Kb, for example, so that messages 2 Kb or below are copied across database instances, but above 2 Kb, instead, as discussed, some database instances may include some form of pointer, handle, or link to a stored version of the one or more signal packets. If, however, greater throughput is desired, a message threshold size may, for example, be reduced to 1 Kb. As a result, throughput should be capable of increasing, thus, raising scalability, as described; however, likewise, reliability may decrease for messages above 1 Kb in comparison with reliability before message size threshold adjustment. Likewise, for messages having a size above a message size threshold, for example, a scalability/reliability level may likewise be adjusted in an embodiment in essentially real-time by modifying the ratio of database instances storing signal packets and database instances instead providing some form of pointer, handle, or link to a stored version of the one or more signal packets. Likewise, in some embodiments, if desired, nodes may be added or removed to adjust the number of database instances.

Consistent with the foregoing description, in an embodiment, for example, a determination may be made that adjusting a scalability/reliability level of the queuing system in real-time may be desirable. For example, system measurements of throughput and/or other system parameters may be collected in an embodiment and particular values may trigger system actions. Actions may include altering settings for RPQ 435, for example. For example, to the extent that a determination is made that a queuing system should tend towards greater throughput, a scalability/reliability level may be adjusted by, among other things, altering a size threshold related to replicating signal packets and/or altering a number of database nodes in the queuing system, as previously discussed, to name but a few examples.

In one embodiment, again, as alluded to previously, RPQ 435 may include a real-time adjustment capability. For instance, in one case, a threshold related to message size for copying, rather than merely copying a pointer, may be adjusted and thereby adjust scalability/reliability level. By way of non-limiting example, in one embodiment, a threshold related to message size may be set at 1K, for example. As suggested, changing message size threshold in this example so that more signal packets are copied into the queue may lead to greater reliability. Alternatively, changing message size threshold so that fewer of the signal packets are copied into the queue may lead to greater scalability.

In this example, web server 440 may comprise any suitable combination of hardware, software, and/or firmware capable of facilitating a method of communication between computing devices on a network, such as, for example network 410, which might be the Internet in one embodiment. For instance, in one embodiment web server 440 may be capable of receiving signal packets comprising various forms of content, such as emails, instant messages, etc., to name a few examples.

In one implementation, web server 440 may be capable of taking advantage of available application programming interfaces (APIs) associated with queuing, such as for signal packets, for example. In particular, these APIs are known as Insert, Peek, and Delete and provide basic operations in connection with a queue. Thus, in one example, an Insert call may be operable to insert content into a queue, such as, in this example, an RPQ. Likewise, in one embodiment, a Peek call may return content from a queue without removing it. Likewise, a Delete call may delete content from a queue. Thus, a Peek call may be followed by a Delete call in an embodiment. However, in another embodiment, content that is peeked may not be given to another consumer for a given period of time (e.g., time-to-live (TTL)). After TTL has expired, and if the consumer does not employ a Delete call, the content may be made available to the next consumer These APIs are known in the art and shall not be described in any further detail.

A distributed system coordination component, such as 455, may typically be employed in systems that are distributed across a network (e.g., a distributed system). Distributed system coordination component 455, for example, may be capable of implementing naming conventions, managing configuration of a distributed system, and handling synchronization. In one embodiment, distributed system coordination component 455 may reside across multiple computing devices in one embodiment. Likewise, in one embodiment, a given RPQ may comprise a plurality of distributed system coordination components, typically an odd number, such as three, for implementation of quorum determinations. By way of example, in one embodiment, distributed system service component 455 may comprise a version of an Apache Zookeeper. Of course, the claimed subject matter is not restricted to the foregoing implementations.

Of course, system parameters may vary with a variety of factors, such as amount of memory, type of memory, number of nodes, etc. Therefore, claimed subject matter is not limited to particular thresholds, throughput, error rates, etc. However, experimentally, a 16-node cluster with a node having 8 GB of random access memory, 8 cores, and 8 disks was tested and up to 8 nodes was able to scale linearly from 22 k puts per second to 45 k puts per section with a message threshold size of 1 K.

Although claimed subject matter is not limited in scope in this respect, in an implementation, such as the implementation illustrated in FIG. 4, for example, additional features of a queuing system in accordance with claimed subject matter may include aspects of queuing semantics and/or starvation avoidance. In particular, rather than queuing semantics that employ strict ordering, such as first-in, first-out (FIFO), which is an example of strict ordering, instead, in an embodiment, such as RPQ 435, consumption make take place without employing strict ordering. Instead, an approach may be employed in which content may be consumed within a particular time of production, although, in an embodiment, the particular time may be adjustable, for example. Thus, using email as an example, a second email produced after a first email may be delivered to its destination before the first email is delivered to its destination; however, the first email shall be delivered to its destination within a particular time after being produced.

Although claimed subject matter is not limited in scope in this respect, in an implementation, such as the implementation illustrated in FIG. 4, for example, another feature of semantics is referred to in this context as at-least-once semantics. In one example implementation of at-least-once semantics, again, using email as an example, an email contained in an embodiment of an RPQ shall be consumed at least once before being deleted from the queue. One advantage of at-least-once semantics for example may be a situation in which, for example, during consumption, a failure occurs, such as a failure of the consuming device, such as an intermediate networking device, for example. Without at-least-once semantics being implemented, if a failure occurs during consumption, in this email example, the email may be lost without an ability to be recovered. However, with at-least-once semantics being implemented, the email remains recoverable from the RPQ, for example, and may be consumed by another intermediate networking device, for example.

Although claimed subject matter is not limited in scope in this respect, in an implementation, such as the implementation illustrated in FIG. 4, for example, another feature is referred to in this context as starvation avoidance. This may arise in a situation in which all or nearly all communications, again, such as email, as a non-limiting example, are high priority, particular in embodiments without a strict FIFO queuing semantic. Thus, by way of example, in an embodiment, RPQ 435 may be capable of periodically examining time stamps of low priority messages and may determine whether a time threshold, which may be adjustable in an embodiment, has been exceeded. If so, the particular message identified, may be moved to a high-priority status. In an embodiment in which high priority message are consumed before low-priority messages, for example, risk of not consuming low-priority messages is reduced.

In one embodiment, one or more database instances may run on top of a Hadoop Distributed File System (HDFS), which may, for example, comprise a master server capable of monitoring all region server instances in the cluster of database instances and may also comprise a region server instance. As such, database instances 460b-n, as an example, may also comprise Hbase instances, may also run on top of a HDFS, and/or may also comprise a region server instance. While the preceding refers to components related to Apache's Hadoop project, this is done merely as another illustration and is not intended to limit claimed subject matter to a Hadoop framework, for example.

Figure 5:
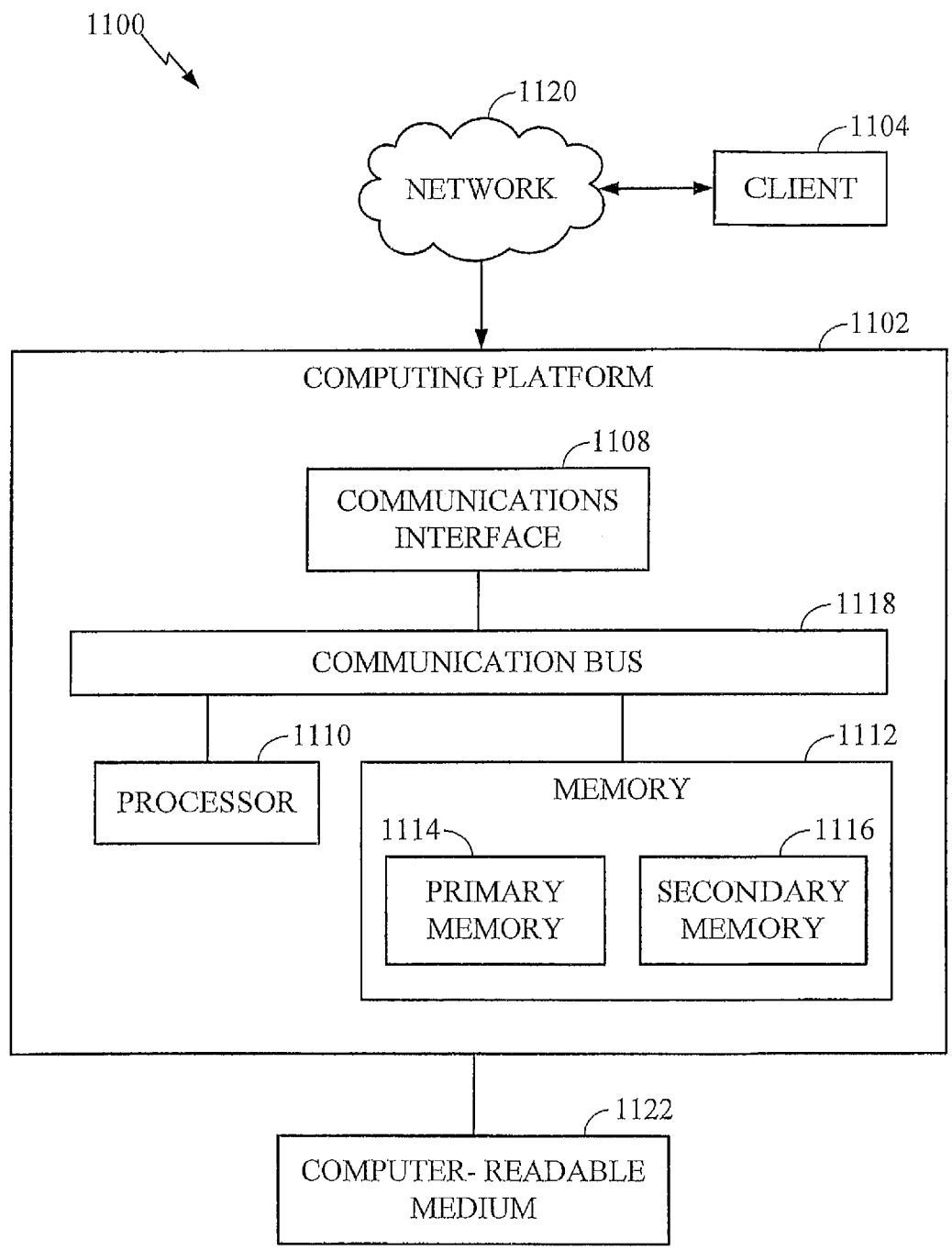
FIG. 5 is a schematic diagram illustrating an implementation of an example computing environment for signal transmission and/or reception.

FIG. 5 is an illustration of an embodiment of a computing platform 1102 that may be employed in a client-server type interaction, such as described in connection with rendering a GUI via a device, such as a network device and/or a computing device, for example. In FIG. 5, computing platform 1102 may interface with client 1104, which may comprise features of a conventional client device, for example. Communications interface 1108, processor (e.g., processing unit) 1110, and memory 1112, which may comprise primary memory 1114 and secondary memory 1116, may communicate by way of communication bus 1118, for example. In FIG. 5, client 1104 may represent one or more sources of analog, uncompressed digital, lossless or lossy compressed digital formats for content of various types, such as video, imaging, text, audio, etc. in the form physical states or signals, for example. Client 1104 may communicate with computing platform 1102 by way of an Internet connection via network 1120, for example. Although the computing platform of FIG. 5 shows the above-identified components, claimed subject matter is not limited to computing platforms having only these components as other implementations may include alternative arrangements that may comprise additional components, fewer components, or components that function differently while achieving similar results. Rather, examples are provided merely as illustrations. It is not intended that claimed subject matter to limited in scope to illustrative examples.

Processor 1110 may be representative of one or more circuits, such as digital circuits, to perform at least a portion of a computing procedure or process. By way of example, but not limitation, processor 1110 may comprise one or more processors, such as controllers, microprocessors, microcontrollers, application specific integrated circuits, digital signal processors, programmable logic devices, field programmable gate arrays, and the like, or any combination thereof. In implementations, processor 1110 may perform signal processing to manipulate signals or states and/or to construct signals or states, for example.

Memory 1112 may be representative of any storage mechanism. Memory 1112 may comprise, for example, primary memory 1114 and secondary memory 1116, additional memory circuits, mechanisms, or combinations thereof may be used. Memory 1112 may comprise, for example, random access memory, read only memory, or one or more data storage devices or systems, such as, for example, a disk drive, an optical disc drive, a tape drive, a solid-state memory drive, just to name a few examples. Memory 1112 may be utilized to store a program. Memory 1112 may also comprise a memory controller for accessing computer readable-medium 1122 that may carry and/or make accessible content, code, and/or instructions, for example, executable by processor 1110 or some other controller or processor capable of executing instructions, for example.

Under the direction of processor 1110, memory, such as memory cells storing physical states, representing for example, a program, may be executed by processor 1110 and generated signals may be transmitted via the Internet, for example. Processor 1110 may also receive digitally-encoded signals from client 1104.

Network 1120 may comprise one or more network communication links, processes, services, applications and/or resources to support exchanging communication signals between a client, such as 1104 and computing platform 1102, which may, for example, comprise one or more servers (not shown). By way of example, but not limitation, network 112o may comprise wireless and/or wired communication links, telephone or telecommunications systems, Wi-Fi networks, Wi-MAX networks, the Internet, a local area network (LAN), a wide area network (WAN), or any combinations thereof.

The term "computing platform," as used herein, refers to a system and/or a device, such as a computing device, that includes a capability to process (e.g., perform computations) and/or store data in the form of signals and/or states. Thus, a computing platform, in this context, may comprise hardware, software, firmware, or any combination thereof (other than software per se). Computing platform 1102, as depicted in FIG. 5, is merely one such example, and the scope of claimed subject matter is not limited to this particular example. For one or more embodiments, a computing platform may comprise any of a wide range of digital electronic devices, including, but not limited to, personal desktop or notebook computers, high-definition televisions, digital versatile disc (DVD) players and/or recorders, game consoles, satellite television receivers, cellular telephones, personal digital assistants, mobile audio and/or video playback and/or recording devices, or any combination of the above. Further, unless specifically stated otherwise, a process as described herein, with reference to flow diagrams and/or otherwise, may also be executed and/or affected, in whole or in part, by a computing platform.

Memory 1112 may store cookies relating to one or more users and may also comprise a computer-readable medium that may carry and/or make accessible content, code and/or instructions, for example, executable by processor 1110 or some other controller or processor capable of executing instructions, for example. A user may make use of an input device, such as a computer mouse, stylus, track ball, keyboard, or any other similar device capable of receiving user actions and/or motions as input signals. Likewise, a user may make use of an output device, such as a display, a printer, etc., or any other device capable of providing signals, generating visual or audio stimuli or other similar output stimuli for a user.

Regarding aspects related to a communications or computing network, a wireless network may couple client devices with a network. A wireless network may employ stand-alone ad-hoc networks, mesh networks, Wireless LAN (WLAN) networks, cellular networks, and/or the like. A wireless network may further include a system of terminals, gateways, routers, or the like coupled by wireless radio links, and/or the like, which may move freely, randomly or organize themselves arbitrarily, such that network topology may change, at times even rapidly. Wireless network may further employ a plurality of network access technologies, including Long Term Evolution (LTE), WLAN, Wireless Router (WR) mesh, 2nd, 3rd, or 4th generation (2G, 3G, or 4G) cellular technology, other technologies, and/or the like. Network access technologies may enable wide area coverage for devices, such as client devices with varying degrees of mobility, for example.

A network may enable radio frequency or other wireless type communications via a network access technology, such as Global System for Mobile communication (GSM), Universal Mobile Telecommunications System (UMTS), General Packet Radio Services (GPRS), Enhanced Data GSM Environment (EDGE), 3GPP Long Term Evolution (LTE), LTE Advanced, Wideband Code Division Multiple Access (WCDMA), Bluetooth, 802.11b/g/n, or other, or the like. A wireless network may include virtually any type of now known, or to be developed, wireless communication mechanism by which signals may be communicated between devices, such as a client device, such as a computing device and/or a network device, between or within a network, or the like.

Communications between a computing device and/or a network device and a wireless network may be in accordance with known, or to be developed cellular telephone communication network protocols including, for example, global system for mobile communications (GSM), enhanced data rate for GSM evolution (EDGE), and worldwide interoperability for microwave access (WiMAX). A computing device and/or a networking device may also have a subscriber identity module (SIM) card, which, for example, may comprise a detachable smart card that is able to store subscription information of a user, and/or is also able to store a contact list of the user. A user may own the computing device and/or networking device or may otherwise be a user, such as a primary user, for example. A computing device may be assigned an address by a wireless or wired telephony network operator, or an Internet Service Provider (ISP). For example, an address may comprise a domestic or international telephone number, an Internet Protocol (IP) address, and/or one or more other identifiers. In other embodiments, a communication network may be embodied as a wired network, wireless network, or any combinations thereof.

A device, such as a computing and/or networking device, may vary in terms of capabilities and/or features. Claimed subject matter is intended to cover a wide range of potential variations. For example, a device may include a numeric keypad or other display of limited functionality, such as a monochrome liquid crystal display (LCD) for displaying text, for example. In contrast, however, as another example, a web-enabled device may include a physical or a virtual keyboard, mass storage, one or more accelerometers, one or more gyroscopes, global positioning system (GPS) or other location-identifying type capability, and/or a display with a higher degree of functionality, such as a touch-sensitive color 2D or 3D display, for example.

A computing and/or network device may include or may execute a variety of now known, or to be developed operating systems, derivatives and/or versions thereof, including personal computer operating systems, such as a Windows, iOS, Linux, a mobile operating system, such as iOS, Android, Windows Mobile, and/or the like. A computing device and/or network device may include or may execute a variety of possible applications, such as a client software application enabling communication with other devices, such as communicating one or more messages, such as via email, short message service (SMS), and/or multimedia message service (MMS), including via a network, such as a social network including, but not limited to, Facebook, LinkedIn, Twitter, Flickr, and/or Google+, to provide only a few examples. A computing and/or network device may also include or execute a software application to communicate content, such as, for example, textual content, multimedia content, and/or the like. A computing and/or network device may also include or execute a software application to perform a variety of possible tasks, such as browsing, searching, playing various forms of content, including locally stored or streamed video, or games such as, but not limited to, fantasy sports leagues. The foregoing is provided merely to illustrate that claimed subject matter is intended to include a wide range of possible features or capabilities.

A network may also be extended to another device communicating as part of another network, such as via a virtual private network (VPN). To support a VPN, logical broadcast domain transmissions may be forwarded to the VPN device via another network. For example, a software tunnel may be created between a logical broadcast domain, and a VPN device. Tunneled traffic may, or may not be encrypted, and a tunneling protocol may be substantially compliant with and/or substantially compatible with any past, present or future versions of any of the following protocols: IPSec, Transport Layer Security, Datagram Transport Layer Security, Microsoft Point-to-Point Encryption, Microsoft's Secure Socket Tunneling Protocol, Multipath Virtual Private Network, Secure Shell VPN, another existing protocol, and/or another protocol that may be developed.

A network may communicate via signal packets, such as in a network of participating digital communications, A logical broadcast domain may be compatible with now known, or to be developed, past, present, or future versions of any, but not limited to the following network protocol stacks: ARCNET, AppleTalk, ATM, Bluetooth, DECnet, Ethernet, FDDI, Frame Relay, HIPPI, IEEE 1394, IEEE 802.11, IEEE-488, Internet Protocol Suite, IPX, Myrinet, OSI Protocol Suite, QsNet, RS-232, SPX, System Network Architecture, Token Ring, USB, and/or X.25. A logical broadcast domain may employ, for example, TCP/IP, UDP, DECnct, NetBEUI, IPX, Appletalk, other, and/or the like. Versions of the Internet Protocol (IP) may include IPv4, IPv6, other, and/or the like.

It will, of course, be understood that, although particular embodiments will be described, claimed subject matter is not limited in scope to a particular embodiment or implementation. For example, one embodiment may be in hardware, such as implemented to operate on a device or combination of devices, for example, whereas another embodiment may be in software. Likewise, an embodiment may be implemented in firmware, or as any combination of hardware, software, and/or firmware, for example (other than software per se). Likewise, although claimed subject matter is not limited in scope in this respect, one embodiment may comprise one or more articles, such as a storage medium or storage media. Storage media, such as, one or more CD-ROMs and/or disks, for example, may have stored thereon instructions, executable by a system, such as a computer system, computing platform, and/or other system, such as a computing device and/or a network device, for example, that may result in an embodiment of a method in accordance with claimed subject matter being executed, such as a previously described embodiment, for example; although, of course, claimed subject matter is not limited to previously described embodiments. As one potential example, a computing platform may include one or more processing units or processors, one or more devices capable of inputting/outputting, such as a display, a keyboard and/or a mouse, and/or one or more memories, such as static random access memory, dynamic random access memory, flash memory, and/or a hard drive.

Algorithmic descriptions and/or symbolic representations are examples of techniques used by those of ordinary skill in the signal processing and/or related arts to convey the substance of their work to others skilled in the art. An algorithm is here, and generally, is considered to be a self-consistent sequence of operations and/or similar signal processing leading to a desired result. In this context, operations and/or processing involves physical manipulation of physical quantities. Typically, although not necessarily, such quantities may take the form of electrical and/or magnetic signals and/or states capable of being stored, transferred, combined, compared, processed or otherwise manipulated as electronic signals and/or states representing information. It has proven convenient at times, principally for reasons of common usage, to refer to such physical signals and/or physical states as bits, data, values, elements, symbols, characters, terms, numbers, numerals, information, and/or the like. It should be understood, however, that all of these or similar terms are to be associated with appropriate physical quantities and are merely convenient labels. Unless specifically stated otherwise, as apparent from the preceding discussion, it is appreciated that throughout this specification discussions utilizing terms such as "processing," "computing," "calculating," "determining", "establishing", "obtaining", "identifying", "selecting", "generating", and/or the like may refer to actions and/or processes of a specific apparatus, such as a special purpose computer and/or a similar special purpose computing and/or network device. In the context of this specification, therefore, a special purpose computer and/or a similar special purpose computing and/or network device is capable of processing, manipulating and/or transforming signals and/or states, typically represented as physical electronic and/or magnetic quantities within memories, registers, and/or other information storage devices, transmission devices, and/or display devices of the special purpose computer and/or similar special purpose computing and/or network device. In the context of this particular patent application, as mentioned, the term "specific apparatus" may include a general purpose computing and/or network device, such as a general purpose computer, once it is programmed to perform particular functions pursuant to instructions from program software.

In some circumstances, operation of a memory device, such as a change in state from a binary one to a binary zero or vice-versa, for example, may comprise a transformation, such as a physical transformation. With particular types of memory devices, such a physical transformation may comprise a physical transformation of an article to a different state or thing. For example, but without limitation, for some types of memory devices, a change in state may involve an accumulation and/or storage of charge or a release of stored charge. Likewise, in other memory devices, a change of state may comprise a physical change, such as a transformation in magnetic orientation and/or a physical change or transformation in molecular structure, such as from crystalline to amorphous or vice-versa. In still other memory devices, a change in physical state may involve quantum mechanical phenomena, such as, superposition, entanglement, and/or the like, which may involve quantum bits (qubits), for example. The foregoing is not intended to be an exhaustive list of all examples in which a change in state form a binary one to a binary zero or vice-versa in a memory device may comprise a transformation, such as a physical transformation. Rather, the foregoing is intended as illustrative examples.

In the preceding description, various aspects of claimed subject matter have been described. For purposes of explanation, systems or configurations were set forth to provide an understanding of claimed subject matter. However, claimed subject matter may be practiced without those specific details. In other instances, well-known features were omitted or simplified so as not to obscure claimed subject matter.

While certain features have been illustrated or described herein, many modifications, substitutions, changes or equivalents will now occur to those skilled in the art. It is, therefore, to be understood that the appended claims are intended to cover all such modifications or changes as fall within the true spirit of claimed subject matter.

What is claimed is:

1. A method comprising:
   determining whether to replicate signal packets across a total number of database instances based, at least in part, on a message threshold size; and
   adjusting in real-time a scalability/reliability level of a queuing system based, at least in part, on the determination.

2. The method of claim 1, wherein the adjusting the scalability/reliability level of the queuing system comprising adjusting one or more settings associated with a reliable persistent queue (RPQ).

3. The method of claim 2, further comprising adding or removing a database instance node to or from the queuing system, respectively, in real-time in response to the adjustments of the one or more settings.

4. The method of claim 1, further comprising replicating one or more columns of a database instance of the total number of database instances separately across a plurality of devices.

5. The method of claim 1, wherein the queuing system implements at-least-once semantics so that signal packets in the queuing system are consumed at least once before being deleted.

6. The method of claim 1, wherein the queuing system implements starvation avoidance.

7. The method of claim 6, further comprising comparing a time stamp of a low priority message with a time threshold, and responsive to determining that the time threshold has been exceeded, moving the low priority message to a high priority status.

8. The method of claim 7, further comprising adjusting the time threshold responsive to the adjustments of the one or more settings.

9. The method of claim 1 further comprising replicating one or more signal packets on less than the total number of database instances based, at least in part, on the message threshold size.

10. The method of claim 9, wherein one or more remaining database instances receives a pointer, handle, or link to a stored version of the one or more signal packets.

11. An apparatus comprising:
at least one computing device to:
determine whether to replicate signal packets across a total number of database instances to be based, at least in part, on a message threshold size; and
implement a queuing system having a capability to adjust in real-time a scalability/reliability level of the queuing system to be based, at least in part, on the determination.

12. The apparatus of claim 11, wherein the at least one computing device comprises a reliable persistent queue (RPQ).

13. The apparatus of claim 12, wherein the RPQ comprises a web server, a messaging component, a distributed system coordination component, and multiple database instances.

14. The apparatus of claim 12, wherein the multiple database instances comprise column-oriented databases.

15. An article comprising: a non-transitory storage medium having stored thereon instructions executable by a computing device to:
determine whether to replicate signal packets across a total number of database instances to be based, at least in part, on a message threshold size; and
adjust in real-time a scalability/reliability level of a queuing system to be based, at least in part, on the determination.

16. The article of claim 15, wherein the instructions are further executable to adjust one or more settings associated with a reliable persistent queue (RPQ).

17. The article of claim 15, wherein the instructions are further executable to replicate one or more columns of a database instance of the total number of database instances separately across at least a second computing device.

18. The article of claim 15, wherein the instructions are further executable to add or remove a database instance node to or from the queuing system, respectively, in real-time in response to the adjustments of the one or more settings.

19. The article of claim 15, wherein the instructions are further executable to implement at-least-once semantics for the queuing system so that signal packets in the queuing system are consumed at least once before being deleted.

20. The article of claim 15, wherein the instructions are further executable to implement starvation avoidance for the queuing system.

* * * * *